Aug. 24, 1937.  L. J. SMALLEN  2,091,110
WATER CONTROL APPARATUS FOR LAVATORIES
Filed Sept. 11, 1936
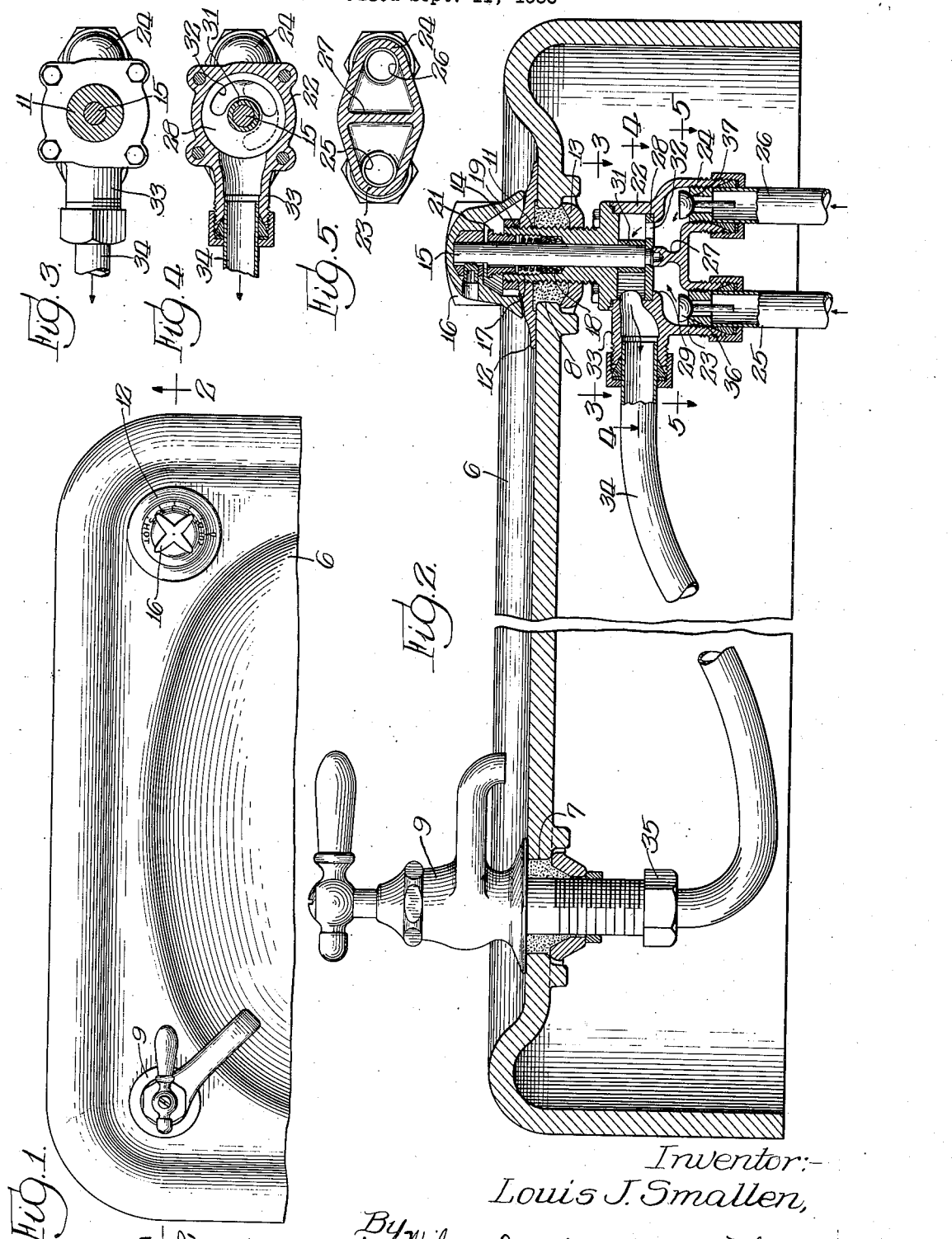
Inventor:-
Louis J. Smallen,
By Wilson, Dowell, McCanna & Foley Attys.

Patented Aug. 24, 1937

2,091,110

UNITED STATES PATENT OFFICE 2,091,110

WATER CONTROL APPARATUS FOR LAVATORIES

Louis J. Smallen, Los Angeles, Calif.

Application September 11, 1936, Serial No. 100,223

6 Claims. (Cl. 4—192)

This invention relates to apparatus for controlling the temperature and the flow of water and, while the principles thereof may be utilized in apparatus designed for various uses, the invention is particularly adaptable to domestic purposes and the embodiment herein illustrated is designed as an adjunct for lavatory bowls.

Lavatory bowls are customarily equipped with a hot water faucet and a cold water faucet which discharge separately into the bowl. The user, however, is obliged to regulate the flow from both faucets to obtain the requisite temperature in the bowl and cannot, as a rule, begin using the bowl until the requisite amount has been drawn because, if used while the bowl is being filled, the danger of being burned or scalded by the water from the hot water faucet is always imminent.

Some bowls are equipped with faucets having a common discharge through which the mixture of hot and cold water from the two faucets is delivered into the bowl. Such equipment precludes the danger of scalding by the hot water, but in the use of such an installation independent regulation of the hot and cold water faucets is always necessary and not infrequently one, but not both, of them is turned off and the other is unwittingly left running with consequent waste of water.

I am also aware that combined mixing and shut-off valves are commonly used in controlling the water supply to bath spray heads and the like. Such valves, while permitting regulation of the water temperature, have no provision for regulating the flow of the water when the valve is open. Furthermore, the closing of such a valve destroys the temperature regulation setting, consequently every time such a valve is used the temperature regulation must be reset.

One of the primary purposes of my present invention is to provide an apparatus by which both the temperature and the rate of flow of the delivered water may be regulated and which will enable the flow to be controlled and shut off without disturbing the temperature regulation, so that the next time the flow is turned on water will at once be delivered at the predetermined temperature without the necessity of any readjustment.

Another purpose is to provide an apparatus in the form of an accessory by which present two-faucet bowl installations may be converted to operate in accordance with the principles of my invention by simply replacing one of the faucets with my improved temperature regulator and connecting this regulator with the hot and cold water pipes and with the other faucet, so that all of the water is delivered from this single faucet.

Other purposes and practical advantages of my invention should be readily appreciated as the same becomes better understood by reference to the following description when considered in connection with the accompanying drawing.

On the drawing,

Fig. 1 is a fragmentary plan view of a lavatory bowl equipped with my invention;

Fig. 2 is a sectional view on the line 2—2 of Fig. 1; and

Figs. 3, 4, and 5 are transverse sectional views on the lines 3—3, 4—4, and 5—5, respectively, of Fig. 2.

Referring to the drawing more in detail, reference character 6 indicates a lavatory bowl of usual or preferred construction, the web of which is provided with openings 7 and 8 for the reception of the usual hot and cold water faucets. One of such faucets of standard construction is indicated generally by reference character 9, this faucet being mounted in the web in the usual manner.

In the conversion of a standard installation into one embodying the principles of my invention, the other faucet, which would customarily be mounted in the opening 8, is replaced by a tempering device which can be mounted in said opening. This device in the form illustrated comprises a cylindrical externally threaded body 11 which is clamped in position in the opening 8 by means of the clamp rings 12 and 13 threaded onto the body, the upper clamp ring being locked in position by a lock nut 14.

The body 11 is hollow to accommodate the valve stem 15 which carries the operating knob or handle 16 and is packed against leakage by a packing gland indicated generally by 17, which preferably comprises a gasket 18, a spring 19, and a packing nut 21.

To the lower enlarged end of the body 11 there is bolted or otherwise secured a valve casing 22 providing the nipples 23 and 24 to which the hot and cold water supply pipes 25 and 26 are respectively connected by suitable couplings. The casing is divided transversely, by a partition or dividing wall 27, into two chambers communicating respectively with said hot and cold water supply pipes, and upon the upper face of the dividing wall there is seated a valve disc 28 attached to the lower end of the stem 15 and urged against its seat, comprising the upper face of wall 27 and an annular shoulder 29, by an expansion spring 31.

The valve disc 28 is provided with an arcuate slot 32 of substantially 180° in length, so that it may be totally disposed at one side of the wall as shown in full lines in Fig. 4, thereby permitting a flow therethrough from the cold water supply pipe only, or it may be turned to intermediate position, as indicated in dotted lines in Fig. 4, in which position equal quantities of water from the hot and cold water pipes could flow therethrough, or it may be adjusted to any other position to permit any relative desired flow of hot and cold water to produce a mixture for delivery of any desired temperature.

From the chamber above the disc a nipple 33 projects laterally for connection by a suitable coupling to one end of a pipe 34, the other end of which is connected by a coupling 35 to the faucet 9. All of the water from the mixing valve is, therefore, delivered through pipe 34 to the faucet by which it is discharged at a rate determined by the extent of opening of the faucet. Check valves 36 and 37 prevent back flow into the hot and cold water supply pipes 25 and 26, respectively.

It will be manifest, therefore, that in accordance with my invention the flow of all water delivered to the bowl is controlled and shut off by one faucet, and the temperature of the water delivered is controlled by regulation of the mixing valve. When this valve has been set to deliver water of the desired temperature, no further attention need be paid to it until a different temperature is desired and each time the faucet 9 is turned on water will be promptly delivered at the temperature for which the mixing valve is set. The shutting off of the faucet in no way disturbs the setting of this valve.

The apparatus is adapted to be employed not only in new installations, but it is also particularly suitable for converting hot and cold water faucet installations into a single faucet installation in which the mixing valve simply replaces one of the faucets. In either new or old installations my invention enables the delivery from a single faucet of water of a predetermined temperature and eliminates the necessity for renewed regulation or adjustment for temperature control at each use of the lavatory.

I have shown and described a preferred embodiment of my invention, the structural details of which may obviously be considerably modified without departing from the essence of the invention as defined in the following claims.

I claim:

1. The combination with a lavatory bowl of a flow control faucet mounted on said bowl for regulating the quantity of water flow, a mixing valve mounted on said bowl for regulating the temperature of said water flow, hot and cold water supply pipes connected to said mixing valve, and a connection for delivering water from said mixing valve to said faucet.

2. The combination with a lavatory bowl of a flow control faucet mounted thereon, hot and cold water pipes, and a mixing valve mounted on said bowl remote from said faucet, the inlet side of said valve being connected to said hot and cold water pipes and the outlet side being connected to said faucet.

3. The combination with a lavatory bowl provided with spaced apart faucet mounting openings of a faucet mounted on said bowl in one of said openings, a mixing valve mounted on said bowl in the other of said openings, a pipe connecting the discharge side of said mixing valve with said faucet, and hot and cold water supply pipes connected with the inlet side of said mixing valve.

4. The combination with a lavatory bowl of a faucet mounted thereon, a manually adjustable mixing valve mounted on said bowl, said valve comprising a pair of inlet chambers separated by a wall, a valve disc seated on said wall and provided with an elongated opening adapted to communicate with either or both of said chambers, a mixing chamber separated from said inlet chamber by said disc, and a pipe connecting said mixing chamber with said faucet.

5. The combination with a manually operable faucet of a manually operable mixing valve, a pipe connecting said valve to said faucet, and hot and cold water pipes connected to said valve, the mixing valve comprising a rotatable stem provided with a valve disc having an opening therethrough adapted to communicate with either or both of said water supply pipes.

6. The combination of hot and cold water supply pipes, an adjustable mixing valve for regulating the relative amounts of hot and cold water delivered through said valve to provide a mixture of the desired temperature, a faucet through which said tempered mixture is delivered and whereby the flow of said mixture may be controlled, and a lavatory fixture by which said valve and faucet are supported in accessible position.

LOUIS J. SMALLEN.